United States Patent
Donaghey

(10) Patent No.: US 7,307,999 B1
(45) Date of Patent: Dec. 11, 2007

(54) SYSTEMS AND METHODS THAT IDENTIFY NORMAL TRAFFIC DURING NETWORK ATTACKS

(75) Inventor: Robert J. Donaghey, Lexington, MA (US)

(73) Assignee: BBN Technologies Corp., Cambridge, MA (US)

( * ) Notice: Subject to any disclaimer, the term of this patent is extended or adjusted under 35 U.S.C. 154(b) by 1074 days.

(21) Appl. No.: 10/058,442

(22) Filed: Jan. 28, 2002

Related U.S. Application Data

(60) Provisional application No. 60/269,547, filed on Feb. 16, 2001.

(51) Int. Cl.
*H04J 3/16* (2006.01)

(52) U.S. Cl. .................. 370/465; 370/389; 726/23

(58) Field of Classification Search ........... 370/235, 370/252, 238, 410, 432, 401; 709/224, 240; 713/201, 162
See application file for complete search history.

(56) References Cited

U.S. PATENT DOCUMENTS

| | | | |
|---|---|---|---|
| 6,028,626 A | 2/2000 | Aviv | |
| 6,321,338 B1 | 11/2001 | Porras et al. | |
| 6,484,203 B1 | 11/2002 | Porras et al. | |
| 6,578,147 B1 | 6/2003 | Shanklin et al. | |
| 6,816,973 B1* | 11/2004 | Gleichauf et al. | 726/13 |
| 6,839,754 B2 | 1/2005 | Nowak et al. | |
| 6,850,491 B1* | 2/2005 | Firoiu et al. | 370/235 |
| 6,880,090 B1* | 4/2005 | Shawcross | 726/14 |
| 2002/0002686 A1* | 1/2002 | Vange et al. | 713/201 |
| 2002/0032774 A1 | 3/2002 | Kohler et al. | |
| 2002/0035683 A1* | 3/2002 | Kaashoek et al. | 713/154 |
| 2003/0051026 A1* | 3/2003 | Carter et al. | 709/224 |
| 2003/0097439 A1* | 5/2003 | Strayer et al. | 709/224 |

OTHER PUBLICATIONS

Glave, James, "Smurfing Cripples ISPs," Wired News, www.wired.com, 4 pages, Jan. 7, 1998.

Craig, Andrew, "Internet Gets Slammed By Widespread Attack," TechWeb, Technology News, www.techweb.com, 3 pages, Mar. 4, 1998.

Schuba et al. Analysis of a Denial of Service Attack on TCP. Proceedings of the 1997 IEEE Symposium on Security and Privacy. (1997).

(Continued)

*Primary Examiner*—Edan Orgad
*Assistant Examiner*—Robert W. Wilson
(74) *Attorney, Agent, or Firm*—Ropes & Gray LLP

(57) ABSTRACT

A system protects against loss of communication during network attacks. In a first implementation, a system (120) models the behavior of normal users in a network in response to an application of a first packet filtering technique. The system (120) receives a group of packets from a first user subsequent to the application of the first packet filtering technique and creates one or more models reflecting the behavior of the first user based on the received packets. In another implementation, a system (130) receives a stream of packets subsequent to a filtering technique being applied, partitions the packets into groups, where each group corresponds to more than one packet, and classifies each group of packets as a normal group or an attack group using one or more models. Each model reflects a normal response to an application of the filtering technique. The system (130) forwards groups classified as normal groups, thus preventing network attacks from choking off all communication in the network.

17 Claims, 5 Drawing Sheets

OTHER PUBLICATIONS

Denning, Dorothy E. An Intrusion-Detection Model. IEEE Transactions on Software Engineering. pp. 118-131 (1987).

Jha et al. Markov Chains, Classifiers, and Intrusion Detection. Computer Security Foundations Workshop. Proceedings, 14th IEEE, pp. 206-219. (2001).

Vigna et al. NetSTAT: A Network-based Intrusion Detection Approach. ACSAC(1998).

Stallings, William. Crypotgraphy and Network Security: Principles and Practice. 2nd ed., Prentice Hall, pp. 478-501 (1998).

* cited by examiner

SYSTEMS AND METHODS THAT IDENTIFY NORMAL TRAFFIC DURING NETWORK ATTACKS

RELATED APPLICATIONS

This application claims priority under 35 U.S.C. § 119 based on U.S. Provisional Application Ser. No. 60/269,547, filed Feb. 16, 2001, the disclosure of which is incorporated herein by reference. Moreover, this application relates to U.S. patent Ser. No. 10/058,487, and U.S. patent application Ser. No. 10/058,512, filed concurrently herewith are hereby incorporated herein by reference in their entireties

BACKGROUND OF THE INVENTION

1. Field of the Invention

The present invention relates generally to networks and, more particularly, to systems and methods that improve network performance by identifying normal traffic during network attacks.

2. Description of Related Art

Denial of Service (DoS) attacks represent a major threat to the continuous operation of network devices. In a typical Distributed DoS (DDoS) attack, traffic emanates from a wide range of compromised systems, and packets from these systems are directed at one or more target hosts, e.g., web servers. When a DoS attack occurs across an Internet Service Provider's (ISP's) network, the transmission network may become so congested that the ISP can no longer provide adequate service. Examples of DoS attacks include Smurf attacks, SYN flood attacks, and Ping of Death attacks. All of these may be effected as distributed DoS attacks, where many compromised network devices become the unwitting source of DoS traffic.

A Smurf attack is an assault on a network that floods the network with excessive messages in order to impede normal traffic. An attacking device sends ping requests to a broadcast address on the target network. The attacking device sets the return address to the victim's address. The broadcast address can generate hundreds of response messages from unwitting network devices that eventually overload the target network.

A SYN flood attack is an assault on a network that prevents a Transmission Control Protocol/Internet Protocol (TCP/IP) server from servicing other users. An attacking device sends a counterfeit source address to the server so that a final acknowledgment to the server's SYNchronize-ACKnowledge (SYN-ACK) response in the handshaking sequence is not sent. As a result, the server continues to execute the handshaking sequence until the server either overloads or crashes.

A Ping of Death attack is an assault on a target computer. An attacking device causes the target computer to crash by sending a packet having an invalid packet size value in the packet's header.

To date, major work on combating DoS attacks has focused on router and firewall-based packet filtering mechanisms designed to reject traffic based on simple filtering rules. Ingress packet filtering by ISPs makes tracking attack sources easier, by limiting the range of spoofed source addresses available to DoS traffic generators, but it does not prevent such traffic from reaching targets. Since DoS traffic streams often originate from outside a target's ISP, and because it is currently infeasible to filter traffic at border gateway protocol (BGP) peering points, ingress filtering relies on all other ISPs to provide protection. This strategy is ineffective in the global Internet environment.

With the proliferation of freely available DoS attack software, DoS attacks will become more sophisticated and more frequent and, therefore, produce more far-reaching consequences in the future. Simple filtering, based on examination of IP and TCP layer headers, will become less and less effective against more sophisticated attacks. Even traffic characterization technologies, such as Multi-Protocol Layer Switching (MPLS), that employ high speed header analysis facilities will become inappropriate for filtering DoS traffic, as the rapid reconfiguration required to respond to attacks would impose a serious burden on the backbone traffic engineering system, which is optimized for packet forwarding.

Current attempts to prevent DoS attacks involve an ISP's network operations center (NOC) manually attempting to intervene in the attack. If the DoS attack is successful, the NOC may not be able to "break into" the network connection to thwart the attack. As a result, the NOC may need to spend many hours trying to filter the attacker's data out of their network, while at the same time calming their customers.

Since a successful DoS attack causes the customer's local network, firewall, and possibly web server to become unstable and/or unusable, those customers who rely on electronic commerce are particularly affected by DoS attacks. Unfortunately, the most advanced intrusion detection systems look for specific signatures of attacks in a data flow and then send a message to an operator for manual intervention. By the time the operator attempts to intervene, however, damage from the DoS attack may have already occurred.

Therefore, there exists a need for systems and methods that better protect against network attacks.

SUMMARY OF THE INVENTION

Systems and methods consistent with the present invention address this and other needs by providing a process that protects communication networks and devices against network attacks.

In accordance with the purpose of the invention as embodied and broadly described herein, a method that models the behavior of normal users in a network in response to an application of a first filtering technique is provided. The method includes receiving a group of packets from a first user subsequent to the application of the first filtering technique, and creating at least one model reflecting a behavior of the first user based on the received packets.

In another implementation consistent with the present invention, a system that models normal user behavior in a network is provided. The system includes a memory and a processor. The processor filters packets in the network using a first filtering technique, receives a group of packets from a first user after the filtering, and creates at least one model reflecting a behavior of the first user based on the group of packets.

In still another implementation consistent with the present invention, a system identifies normal traffic during a network attack. The system includes a memory that stores a group of models, where each model reflects a normal response to an application of a filtering technique, and a processor. The processor receives a stream of packets subsequent to a first filtering technique being applied, partitions the stream into strands, where each strand corresponds to a group of packets, and classifies each strand as at least one of an attack strand and a normal strand using the models.

In a further implementation consistent with the present invention, a network includes a first device and at least one second device. The first device creates models to reflect a behavior of normal users in the network in response to an application of at least one filtering technique and transmits the models. The second devices receive the models from the first device, use the models to identify normal traffic in the network once an attack has been detected and filtering applied, and allow the identified normal traffic to pass on toward its destination.

BRIEF DESCRIPTION OF THE DRAWINGS

The accompanying drawings, which are incorporated in and constitute a part of this specification, illustrate an embodiment of the invention and, together with the description, explain the invention. In the drawings.

DETAILED DESCRIPTION

The following detailed description of the invention refers to the accompanying drawings. The same reference numbers may be used in different drawings to identify the same or similar elements. Also, the following detailed description does not limit the invention. Instead, the scope of the invention is defined by the appended claims and their equivalents.

Systems and methods consistent with the present invention protect communication networks and devices against network attacks. During training sessions, normal traffic is blocked for the purpose of observing how normal-user programs respond to such blockage. Models are then created to reflect the behavior of normal users. Upon detection of an attack, a filtering device filters out traffic associated with the attack while allowing normal traffic to continue on toward its destination based on signal from a triage device. The triage device identifies normal traffic in a stream of incoming traffic using the previously-created models of normal user behavior.

System Configuration

Figure 1:
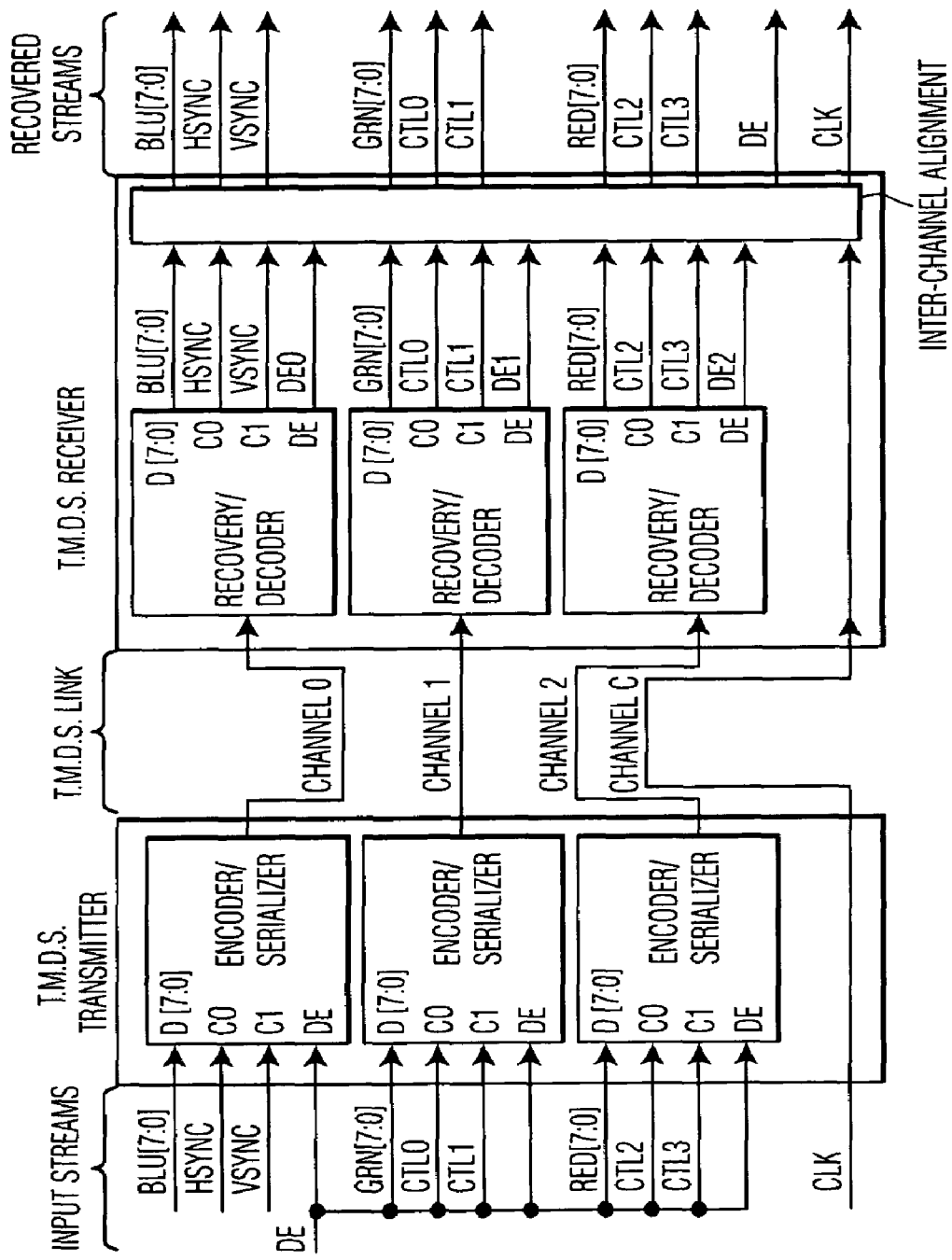
FIG. 1 illustrates an exemplary system in which systems and methods consistent with the present invention may be implemented.

FIG. 1 illustrates an exemplary system 100 in which systems and methods consistent with the present invention may be implemented. As illustrated, system 100 includes a group of network devices 110, a triage center 120, filtering devices 125, and a triage device 130 that are interconnected via a network 140. A single triage center 120 and triage device 130, two filtering devices 125, and six network devices 110 are illustrated for simplicity. It will be appreciated that a typical system may include more or fewer triage centers 120, filtering devices 125, triage devices 130, and network devices 110.

Network 140 may include one or more networks, such as the Internet, an intranet, a wide area network (WAN), a local area network (LAN), or another similar type of network. Network devices 110 may include any type of device that is capable of transmitting and receiving data via network 140, such as a server, personal computer, laptop computer, personal digital assistant, or the like. Network devices 110 may connect to network 140 via a wired, wireless, or optical connection.

Triage center 120 may include one or more devices, such as a high-end computer, a server or collection of servers, or the like, capable of modeling traffic in network 140. As will be described in detail below, triage center 120 models the behavior of normal network users in response their packets being dropped. To do so, triage center 120 causes filtering device 125 to apply different types of filtering to traffic in the network and monitors how "good" sources of traffic behave in response to the different types of filtering. Triage center 120 then builds Hidden Markov Models (HMMs; referred to hereinafter as "stress models") based on the monitored behavior of good sources of traffic. These stress models can later be used to distinguish normal traffic from attack traffic once filtering has been applied. Triage center 120 may connect to filtering device 125 via a wired, wireless, or optical connection.

Figure 2:
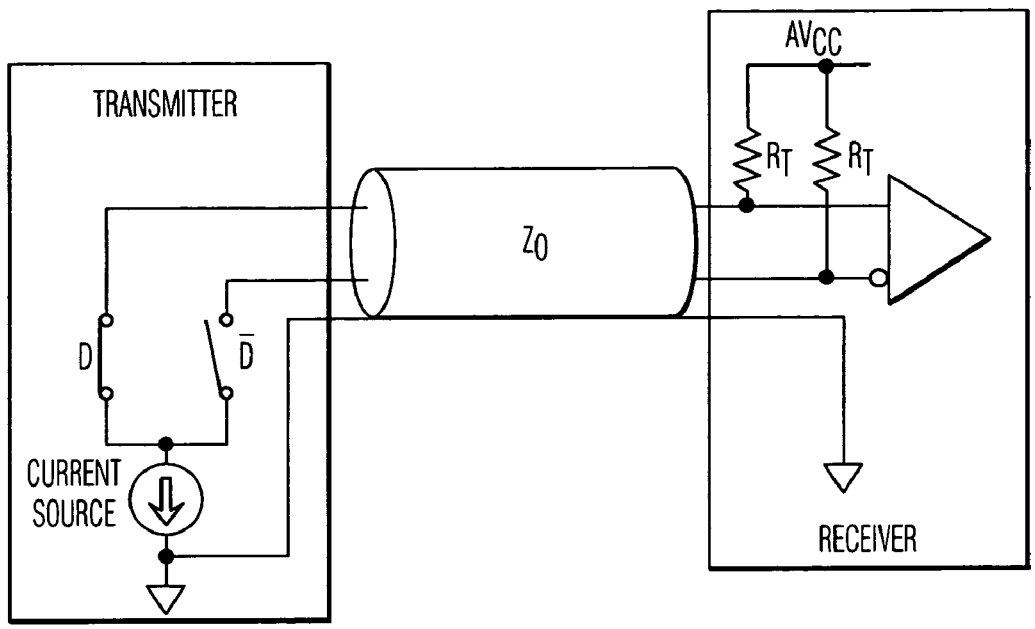
FIG. 2 illustrates an exemplary diagram of the triage center of FIG. 1 in an implementation consistent with the present invention.

FIG. 2 illustrates an exemplary diagram of triage center 120 in an implementation consistent with the present invention. As illustrated, triage center 120 includes a bus 202, a processor 204, a main memory 206, a read only memory (ROM) 208, a storage device 210, an input device 212, an output device 214, and a communication interface 216. Bus 202 permits communication among the components of triage center 120.

Processor 204 may include any type of conventional processor or microprocessor that interprets and executes instructions. Memory 206 may include a random access memory (RAM) or another dynamic storage device (referred to as main memory) that stores information and instructions for execution by processor 204. Main memory 206 may also be used to store temporary variables or other intermediate information during execution of instructions by processor 204.

ROM 208 may include a conventional ROM device and/or another static storage device that stores static information and instructions for processor 204. Storage device 210 may include a magnetic disk or optical disk and its corresponding drive and/or some other type of magnetic or optical recording medium and its corresponding drive for storing information and instructions.

Input device 212 may include one or more conventional mechanisms that permit an operator to input information to triage center 120, such as a keyboard, a mouse, a pen, voice recognition and/or biometric mechanisms, etc. Output device 214 may include one or more conventional mechanisms that output information to the operator, such as a display, a printer, a speaker, etc. Communication interface 216 may include any transceiver-like mechanism that enables triage center 120 to communicate with other devices and/or systems, such as triage device 130. For example, communication interface 216 may include a modem or an Ethernet interface to a network. Alternatively, communication interface 216 may include other mechanisms for communicating via a data network, such as network 140.

Triage center 120 may implement the functions described below in response to processor 204 executing software instructions contained in a computer-readable medium, such as memory 206. A computer-readable medium may be defined as one or more memory devices and/or carrier waves. In alternative embodiments, hardwired circuitry may be used in place of or in combination with software instructions to implement the present invention. Thus, the present invention is not limited to any specific combination of hardware circuitry and software.

Figure 3:
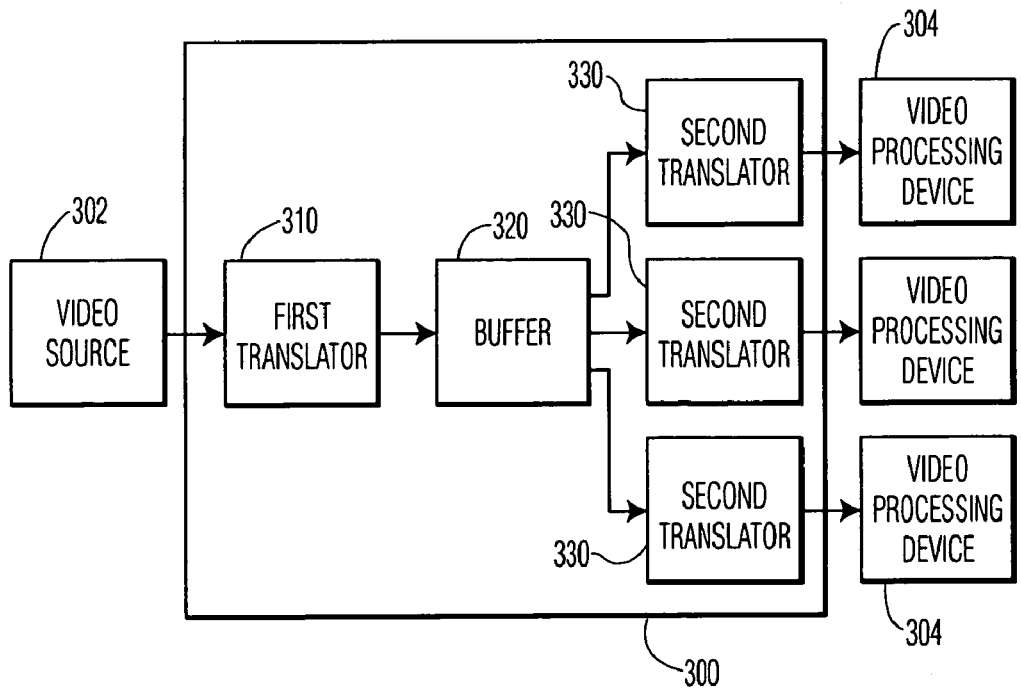
FIG. 3 illustrates an exemplary functional block diagram of the triage center of FIG. 1.

FIG. 3 illustrates an exemplary functional block diagram of triage center 120 of FIG. 1. As illustrated, triage center 120 includes a packet identification and feature extraction unit 310, feature storage 320, an optional traffic splitter 330, model trainer 340, and model storage 350. Triage center 120 may include additional devices (not shown) that aid in the reception, processing, and transmission of data.

Packet identification and feature extraction unit 310 may include one or more devices for receiving strands (or groups) of packets and associating a feature set with each packet in the strands. Packet identification and feature extraction unit 310 stores sets of traffic features corresponding to different types of traffic and different filtering rules.

Packet identification and feature extraction unit 310 may store a list of packet features and identify these features in received packets. These identified features and filtering rules may be associated with the states of the stress models in, for example, model storage 350. It will be appreciated that this list may change over time through the addition, deletion, or modification of features. An exemplary list of features may include:

Type of packets—Transmission Control Protocol (TCP), User Datagram Protocol (UDP), Internet Control Message Protocol (ICMP), SYN, File Transfer Protocol (FTP), Hyper Text Transfer Protocol (HTTP), etc.

Characteristics of packet loads—Byte-count distributions, length, etc. For example, normal packets may be distinguished from ones produced by a traffic generator within a DDoS attacker based on the packet load.

Other features may alternatively be used that will allow for normal traffic to be distinguished from attack traffic.

Feature storage 320 receives and stores the features extracted by packet identification and feature extraction unit 310. To keep the data in feature storage 320 organized, each strand may be annotated as to its salient details. In an implementation consistent with the present invention, feature storage 320 stores annotations regarding the filtering rules (e.g., drop every packet or every other packet from this particular source) that have been applied by triage center 120 prior to the reception of the packet strands, along with the features. Once stress models have been trained for received packet strands, feature storage 320 allows for repeat experiments to be run with the same inputs to verify the accuracy of the trained models.

Traffic splitter 330 may include one or more devices for receiving feature sets corresponding to received packets from packet identification and feature extraction unit 310 or feature storage 320 and for breaking up the feature sets into separate groups. These groups are referred to hereinafter as "traffic strands." Traffic splitter 330 may form traffic strands by grouping packet feature sets based on, for example, the packet's type, a destination address associated with the packet, a source address associated with the packet, etc. It will be appreciated that in those situations where stress models are trained for one situation at a time (i.e., triage center 120 receives a single strand for training), traffic splitter 330 may not be needed. Traffic splitter 330 may also receive one or more annotations with the received feature sets and may associate additional features with the feature sets received for the packets. An exemplary list of features may include:

Characteristics of packet headers—Sequence of TCP sequence numbers or time-to-live (TTL) values. For example, missing numbers due to lost packets may lead to repeats in a predictable pattern on which an HMM can be trained.

Time between similar packets—Packets with the same source address, destination address, type, etc. For example, TCP monitors packet loss and sends packets at ever faster rates when packet loss is low, but throttles back as packet loss increases. The statistical pattern is expected to differ between real traffic and DDoS drones.

Other features may alternatively be used that will facilitate the distinguishing of normal traffic from attack traffic.

Traffic splitter 330 may insert an individual packet's feature set into more than one traffic strand. For example, assume that traffic splitter 330 forms a first traffic strand for packets destined for location A and a second traffic strand for TCP packets. If traffic splitter 330 receives a TCP packet that is destined for location A, traffic splitter 330 may place the feature set for that packet into both the first and second traffic strands.

Once traffic strands have been formed, traffic splitter 330 passes each traffic strand, along with the annotations for that strand, to model trainer 340. As indicated above, the annotations may, for example, indicate the type of filtering that has been applied by triage center 120 to packets from a particular user prior to receiving the present packet strand from that user. Model trainer 340 may include multiple sub-modules that allow for stress models to be trained in parallel based on the traffic strands. Model trainer 340 notes the frequency of state transitions and the values of the features associated with each state. At the end of training, model trainer 340 converts the frequencies, in the case of state transitions, to transition probabilities and, in the case of features, into probability distribution functions. Once created, model trainer 340 stores the stress models in model storage 350. Model trainer 340 may also transmit the stress models to triage device(s) 130 in system 100.

Returning to FIG. 1, filtering device 125 may include one or more devices capable of applying a filtering technique to traffic in the network. The filtering technique may include, for example, dropping all received packets or some subset of the received packets. Filtering device 125 may also include devices for detecting network attacks. Filtering device 125 may connect to network 140 via a wired, wireless, or optical connection.

Triage device 130 may include one or more devices, such as a high-end computer, a server or collection of servers, or the like, capable of identifying normal traffic in a stream of traffic after filtering has been applied by filtering device 125. Although illustrated as a separate device, triage device 130 may be connected to, or implemented within, another device, such as a service provider's platform, filtering device 125, or network device 110. Triage device 130 may connect to filtering device 125 via a wired, wireless, or optical connection.

As will be described in detail below, triage device 130 stores the stress models generated by triage center 120 and uses these models to distinguish normal traffic from attack traffic. Once filtering device 125 has detected an attack and has applied some type of filtering technique, triage device 130 monitors incoming traffic to determine whether, based on the stress models corresponding to the filtering technique applied, the traffic is normal traffic. Triage device 130 may cause filtering device 125 to allow traffic identified as normal traffic to continue on toward its destination, while continuing to filter all other traffic.

Figure 4:
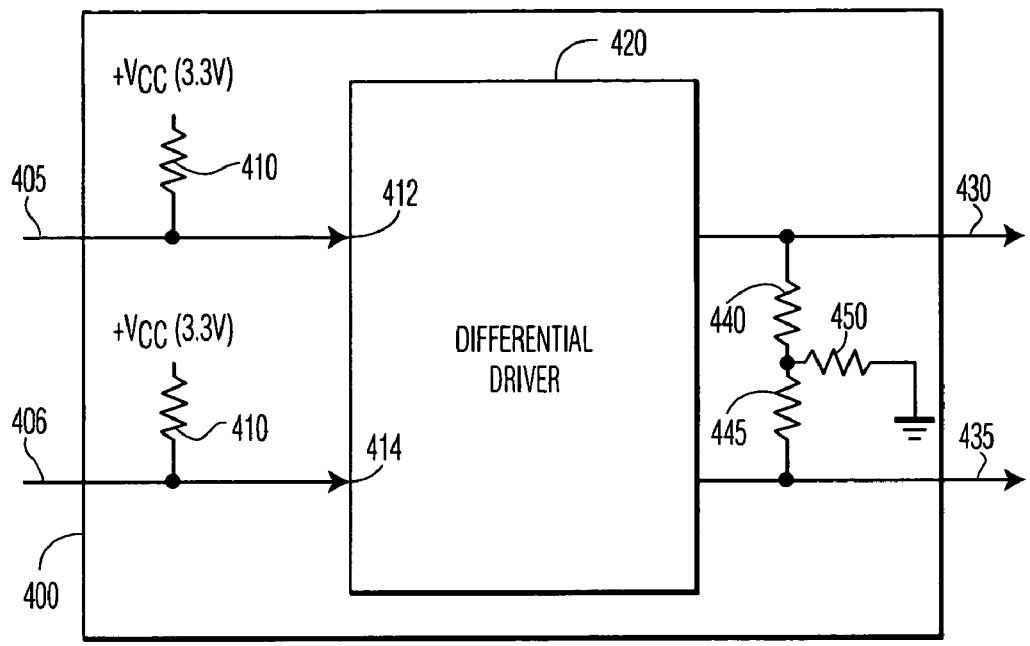
FIG. 4 illustrates an exemplary diagram of the triage device of FIG. 1 in an implementation consistent with the present invention.

FIG. 4 illustrates an exemplary diagram of triage device 130 in an implementation consistent with the present invention. As illustrated, triage device 130 includes a bus 410, a processor 420, a memory 430, an input device 440, an output device 450, and a communication interface 460. Bus 410 permits communication among the components of triage device 130.

Processor 420 may include any type of conventional processor or microprocessor that interprets and executes instructions. Memory 430 may include a RAM or another dynamic storage device that stores information and instructions for execution by processor 420; a ROM or another type of static storage device that stores static information and instructions for use by processor 420; and/or some other type of magnetic or optical recording medium and its corresponding drive.

Input device 440 may include one or more conventional mechanisms that permit an operator to input information to triage device 130, such as a keyboard, a mouse, a pen, voice recognition and/or biometric mechanisms, and the like. Output device 450 may include one or more conventional mechanisms that output information to the operator, including a display, a printer, a speaker, etc. Communication interface 460 may include any transceiver-like mechanism that enables triage device 130 to communicate with other devices and/or systems. For example, communication interface 460 may include mechanisms for communicating with triage center 130 via a network, such as network 140 (FIG. 1).

Triage device 130 may implement the functions described below in response to processor 420 executing software instructions contained in a computer-readable medium, such as memory 430. In alternative embodiments, hardwired circuitry may be used in place of or in combination with software instructions to implement the present invention. Thus, the present invention is not limited to any specific combination of hardware circuitry and software.

Figure 5:
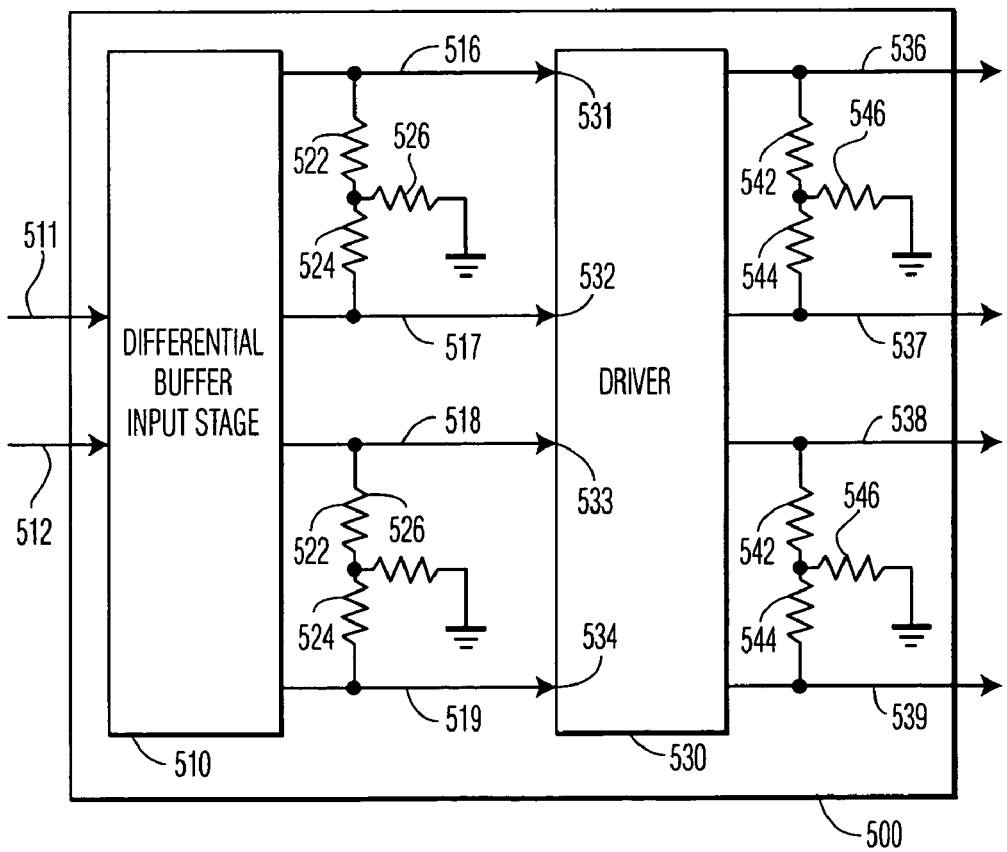
FIG. 5 illustrates an exemplary functional block diagram of the triage device of FIG. 1.

FIG. 5 illustrates an exemplary functional block diagram of triage device 130 of FIG. 1. As illustrated, triage device 130 includes a packet identification and feature extraction unit 310, a traffic splitter 330, a model matcher 510, and an attack decision unit 520. Triage device 130 may include additional devices (not shown) that aid in the reception, processing, and transmission of data.

Packet identification and feature extraction unit 310 and traffic splitter 330 may be configured in a manner similar to that described above with respect to FIG. 3. Upon receipt of a packet stream, packet identification and feature extraction unit 310 may identify packets in the stream and associate a feature set, including one or more features, from a previously-defined packet feature list with the identified packets. Packet identification and feature extraction unit 310 may pass the feature set for each packet to traffic splitter 330, along with an indication of the filtering rules applied by filtering device 125. Traffic splitter 330 forms traffic strands from the received packets' feature sets, associates additional features with the feature sets in the traffic strands, and routes the traffic strands and the identification of the filtering rules to model matcher 510.

Model matcher 510 stores the stress models generated by triage center 120. Model matcher 510 may include multiple sub-modules to allow for processing of multiple traffic strands in parallel.

Model matcher 510 receives traffic strands from traffic splitter 330 and generates "closeness" scores for each stress model against the traffic strands in a well-known manner. To score an observed strand of packets against a set of models and identify the model that is most likely to have been trained on data generated by a similar source, model matcher 510 may use each model to calculate the probability of the strand. Each model is trained on a representative sample of some collection of "similar" sources, and the likelihood of the source of any observed strand of packets being "similar" to those on which a model was trained is highly correlated to the conditional probability computed using the model's probability distributions and functions for that strand. The calculated probabilities of observing some sequence of packet features is high for strands that are similar to those on which the model is trained, and lower for dissimilar sequences.

Attack decision unit 520 receives closeness scores from model matcher 510 and determines whether a traffic strand is part of normal traffic based thereon. For example, attack decision unit 520 may determine that a traffic strand is part of normal traffic when the closest matching model is a stress model. In such a situation, attack decision unit 520 may, for example, transmit a signal to filtering device 125 identifying the strand and indicating that the traffic strand is a normal strand. Filtering device 125 may allow traffic identified as "normal" to pass on toward its destination, while continuing to filter all other traffic.

Exemplary Processing

Figure 6:
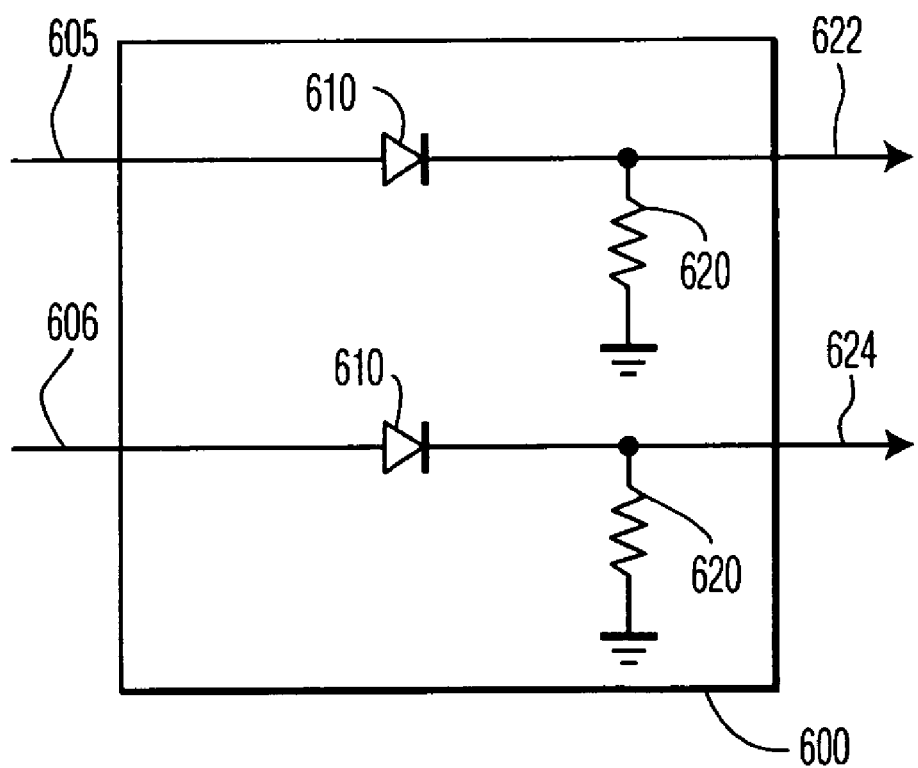
FIG. 6 illustrates an exemplary process for training stress models in an implementation consistent with the present invention.

FIG. 6 illustrates an exemplary process for training stress models in an implementation consistent with the present invention. Processing may begin with filtering device 125 applying a first filtering technique to received traffic [act 610]. The filtering technique may, for example, consist of blocking all incoming packets at the triage center, blocking every other packet, blocking every tenth packet, etc.

Once the first filtering technique has been applied, triage center 120 may receive a group of packet strands [act 620]. The packet strands may relate to a single user upon which stress models are to be trained or multiple comingled users. In some instances, the packet strands may be part of a stream of packets. Triage center 120 may identify packets in the strands and associate features from a previously-created list of features with each packet in the strands [act 630]. These features may include, for example, packet type and characteristics of packet loads.

Triage center 120 may store the features sets for later use in testing trained models [act 630]. Triage center 120 may also store annotations with the features sets. The annotations may indicate the type of filtering that has been applied prior to receiving the traffic strands. In this case, the annotations would identify the first filtering technique. Triage center 120 may form traffic strands from the feature sets based, for example, on the source of the packets to which the feature sets correspond [act 650]. As described above, this act may be avoided in those situations where packets from a single user are presented to triage center 120 at a time. Triage device 120 may also associate other features, such as characteristics of packet headers and time between similar packets, with the feature sets.

Triage center 120 trains stress models from the traffic strands for the first filtering technique [act 660]. To create the stress models, triage center 120 may monitor traffic flow from one or more users in system 100 in response to filtering being applied. Traffic from different users segregates naturally into distinct IP sources. Accordingly, triage center 120 may, for example, partition incoming packets into a separate traffic strand per source, and model these separate traffic strands individually. These models reflect different users' reactions to having transmitted packets dropped. Since the behavior of users is quite varied, and their traffic patterns differ depending on the nature of their tasks, triage center 120 may distinguish the different TCP services, for example, and define and train a separate class of models for each different service.

Triage center 120 may define and create HMM states for each distinct phase of each distinct type of traffic found in a traffic stream that is being modeled, so that ICMP traffic, for example, is modeled independently from each of various UDP services, which are modeled independently from each of various TCP services, etc. Triage center 120 may model each type of service and each phase of that service to properly take into account the differences in the number of distinct phases that a session can go through, and to determine how a user may behave in each phase in response to filtering being applied. For example, HTTP traffic from a client to a Web server is typically characterized by very short packets widely separated in time, while traffic from the Web server back to the client is more often characterized by heavy bursts of traffic of varying size as the server provides the information to fill a web page with formatted backgrounds, text and pictures. The creation of stress models may take these distinguishing features into account.

Triage center 120 may also model inter-packet timing for a stream of packets generated by a single source (user) communicating to a single destination (server) in a single activity. For this modeling, an HMM may be created with states defined appropriately for the distinct phases of this activity to capture the behavior of a normal user during each phase in response to having packets dropped. The training yields a probability density distribution of the time between packets at every state, and transition probabilities for each state to every other state (i.e., the likelihood for each phase that following a packet of the phase of the activity will be a packet of the same or one of the other phases of the activity).

Triage center 120 may also model the inter-packet timing of the full stream of packets generated by a single source (user) communicating to a single destination (server), mixing together several different activities. Triage center 120 may define an HMM with states defined for each of the different activities found in the training data, and within each such activity for each of its distinct phases, capture the full behavior of a normal user with multiple communications comingling together. The training yields a probability density distribution of the time between packets at every state, and transition probabilities for each state to every other state (i.e., the likelihood that following a packet of one phase of one communication will be a packet of the other phase of the other communication).

Once stress models have been created, triage center 120 may store the stress models [act 670]. Triage center 120 may then repeat the above processing for other filtering techniques. In essence, triage center 120 trains stress models on any type of filtering technique that may be applied in response to detecting an attack. Triage center 120 models how good sources of traffic behave in different filtering conditions so that good traffic can later be distinguished from attack traffic when those conditions apply.

Figure 7:
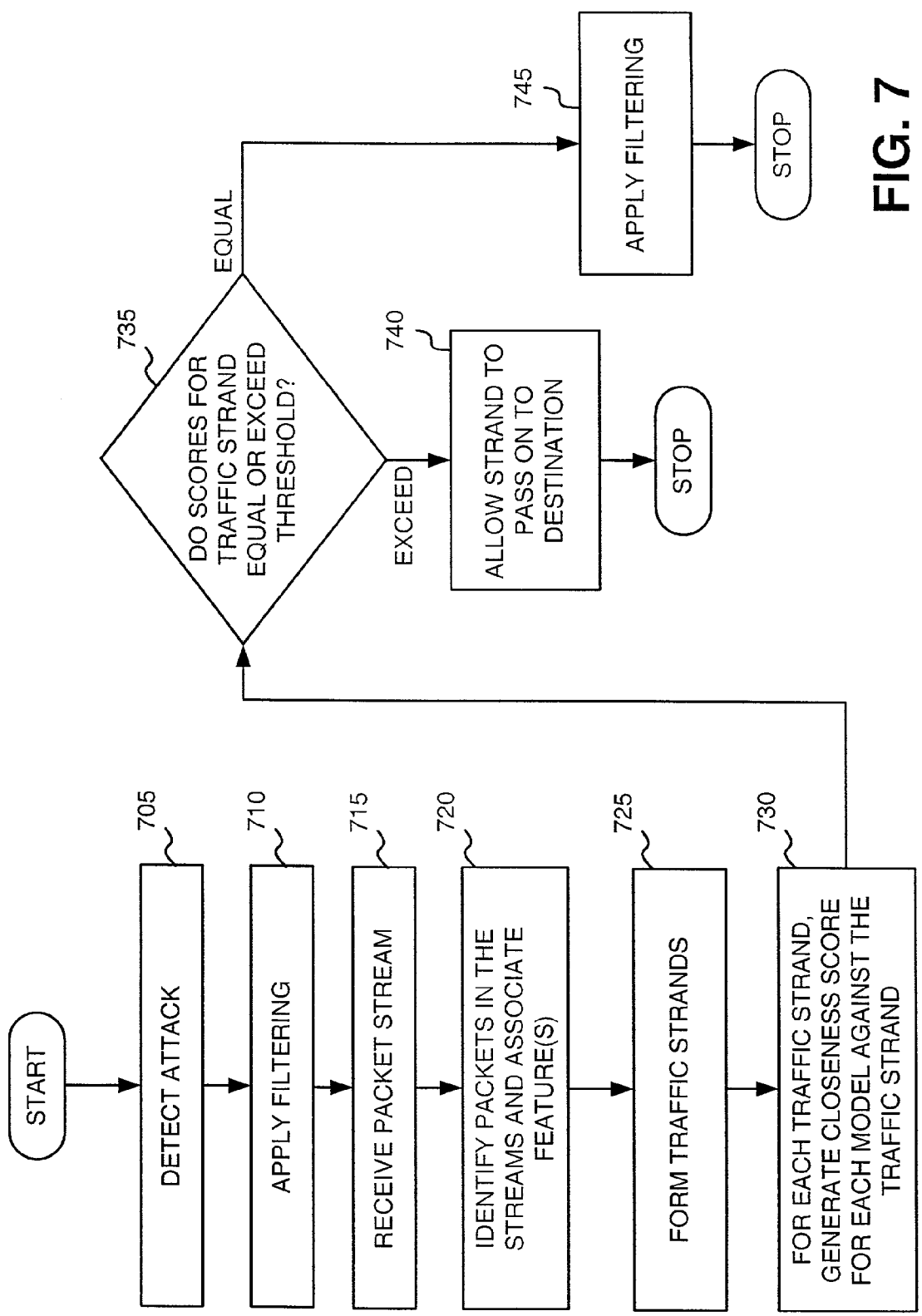
FIG. 7 illustrates an exemplary process for detecting and filtering attack traffic in an implementation consistent with the present invention.
Figure 1:
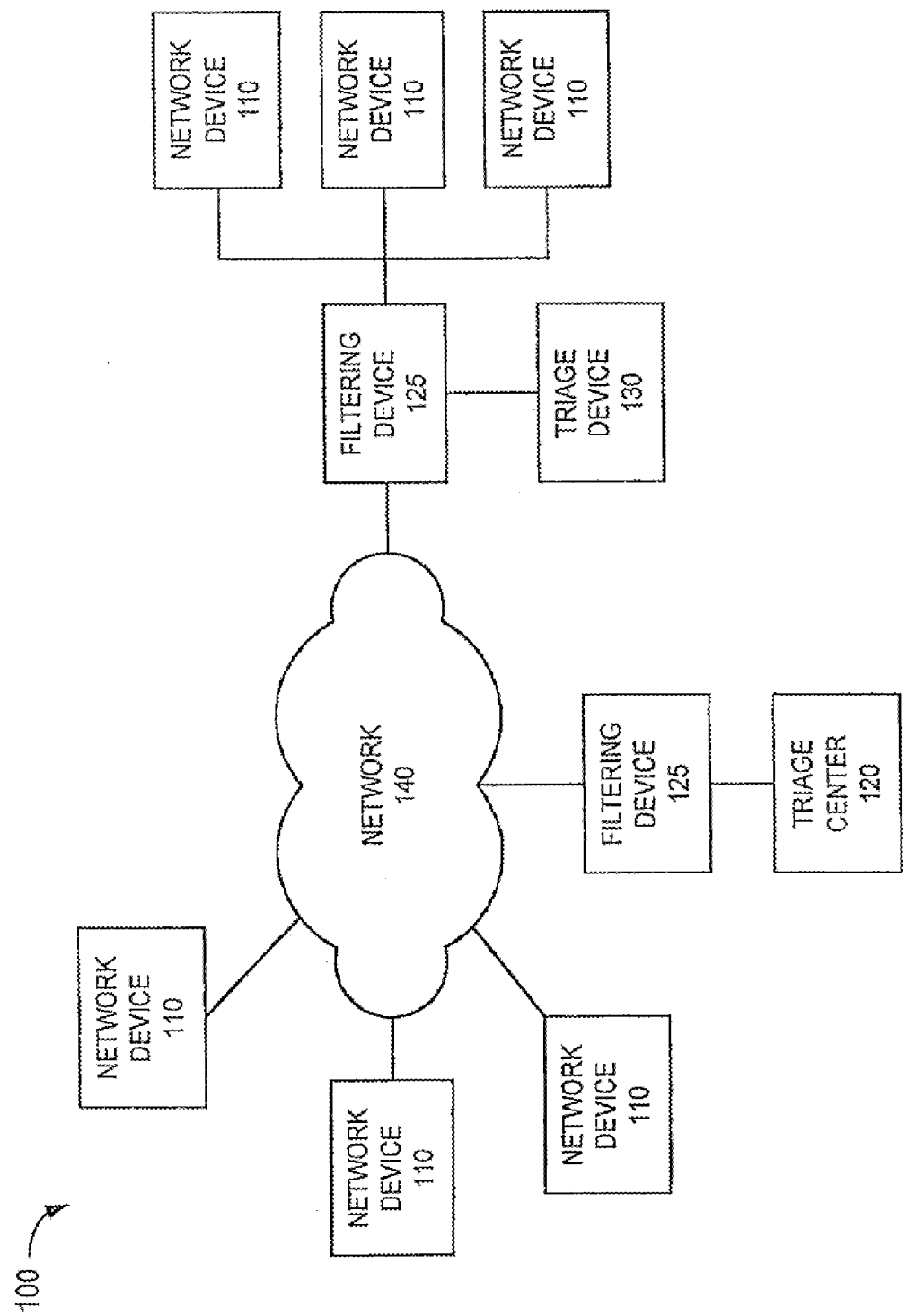
Figure 2:
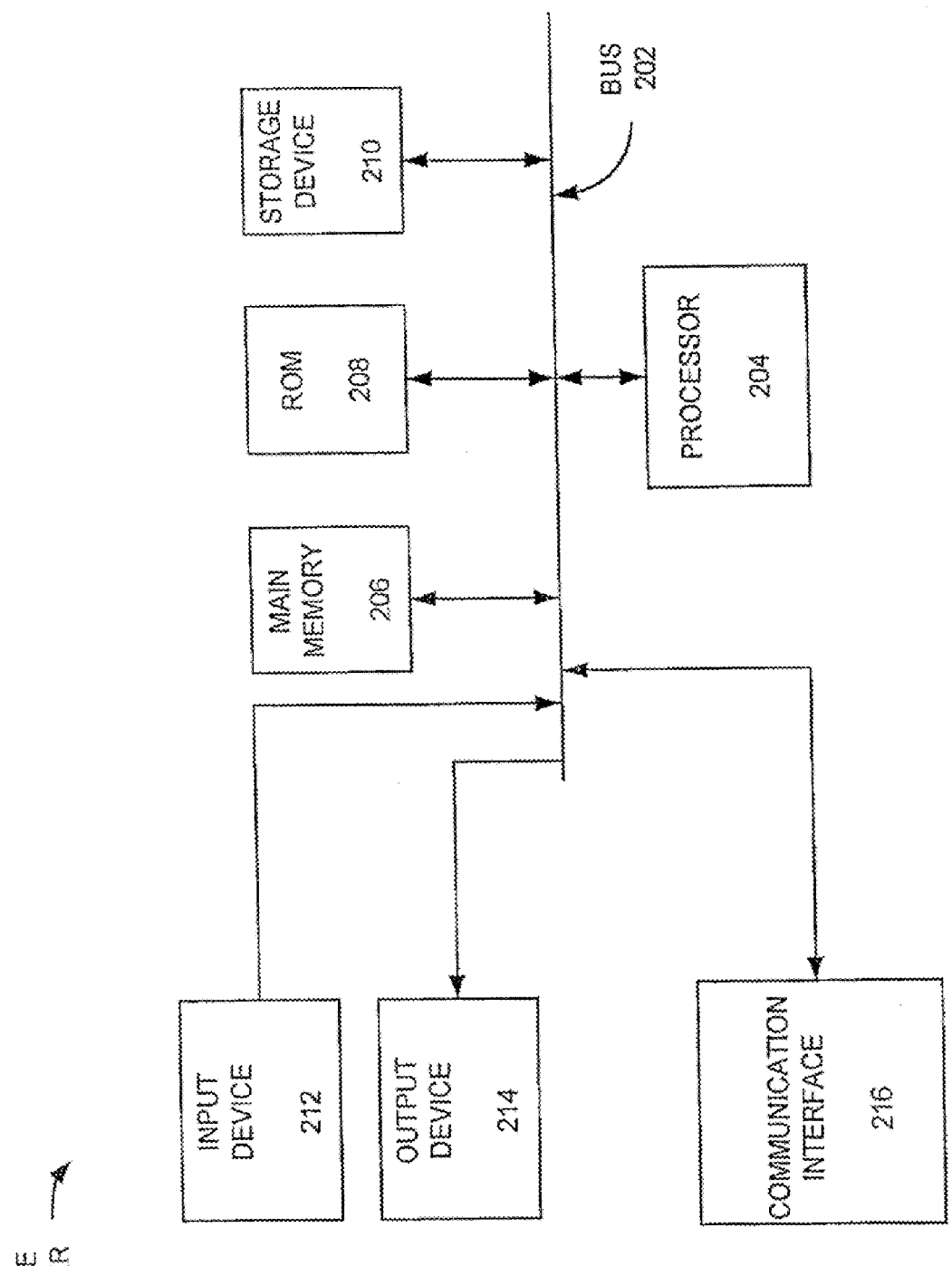
Figure 3:
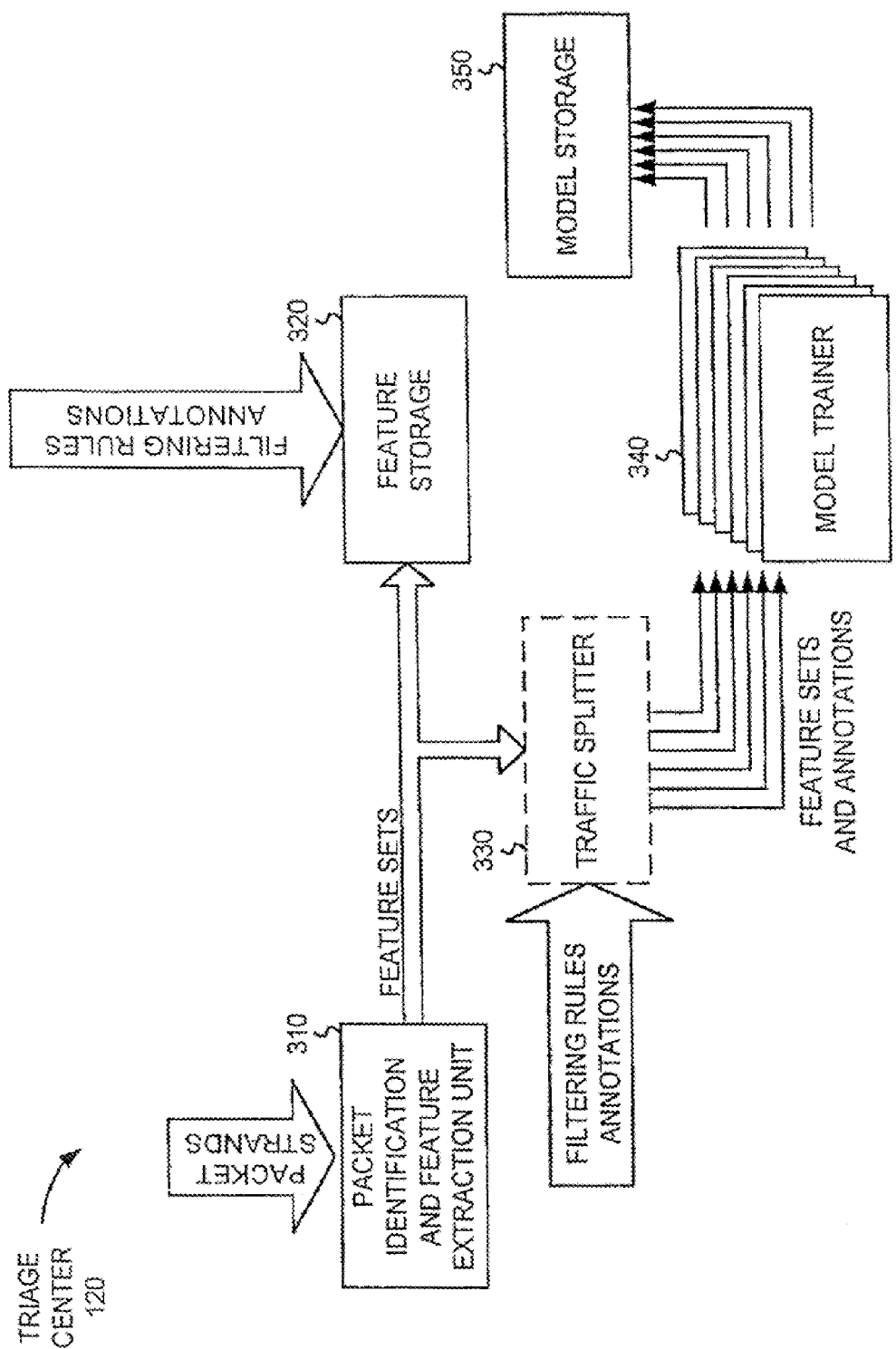
Figure 4:
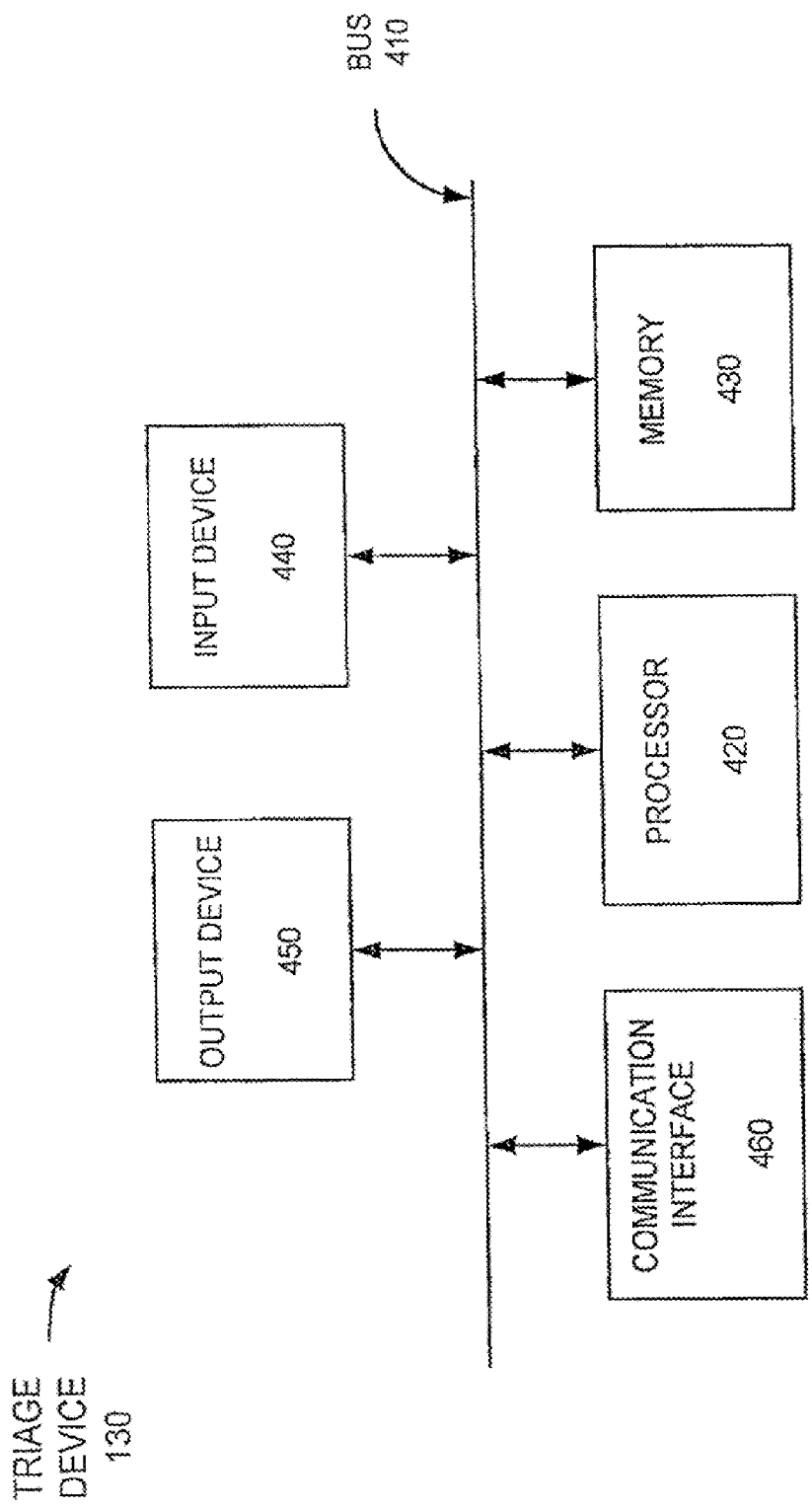
Figure 5:
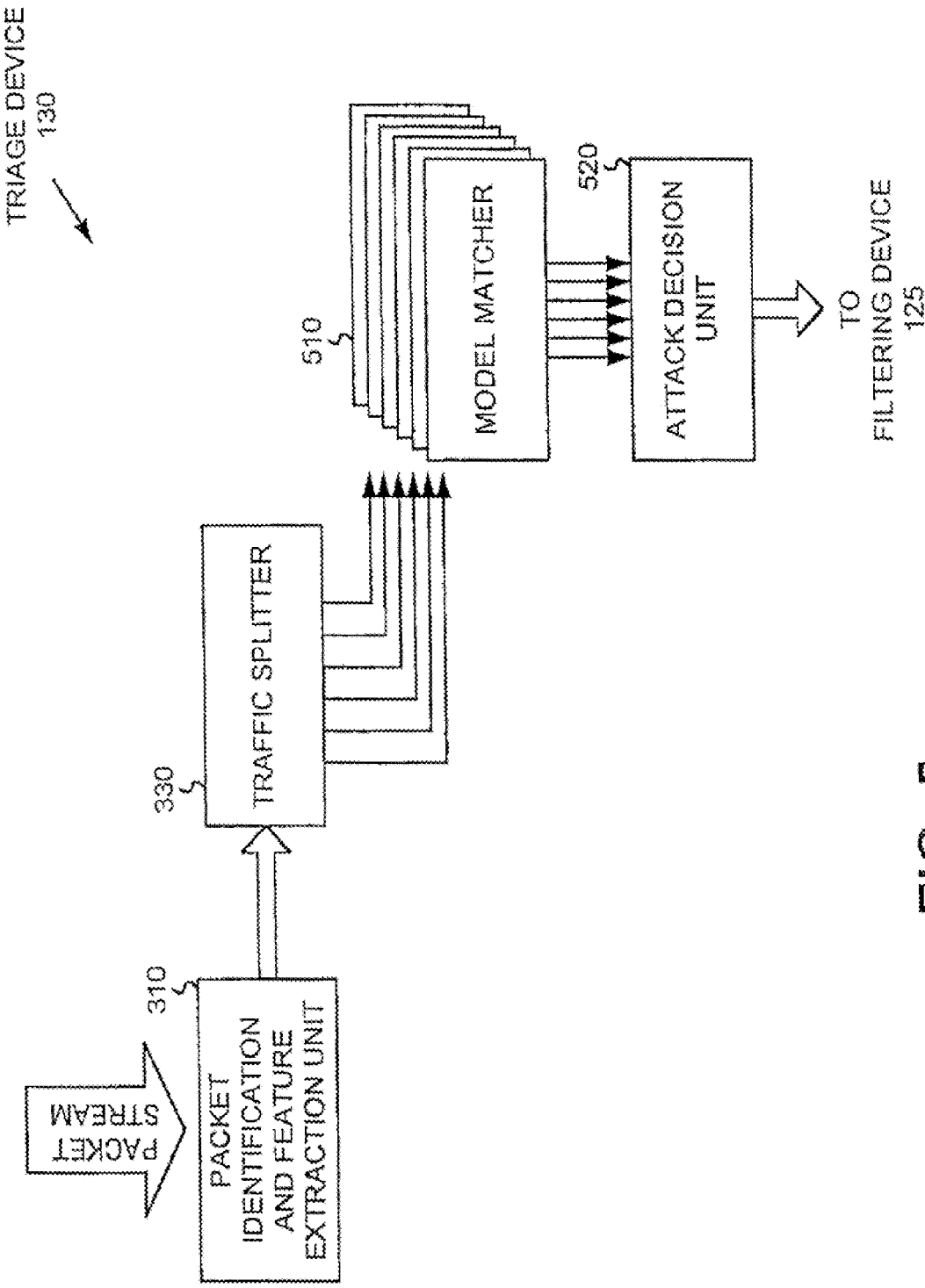
Figure 7:
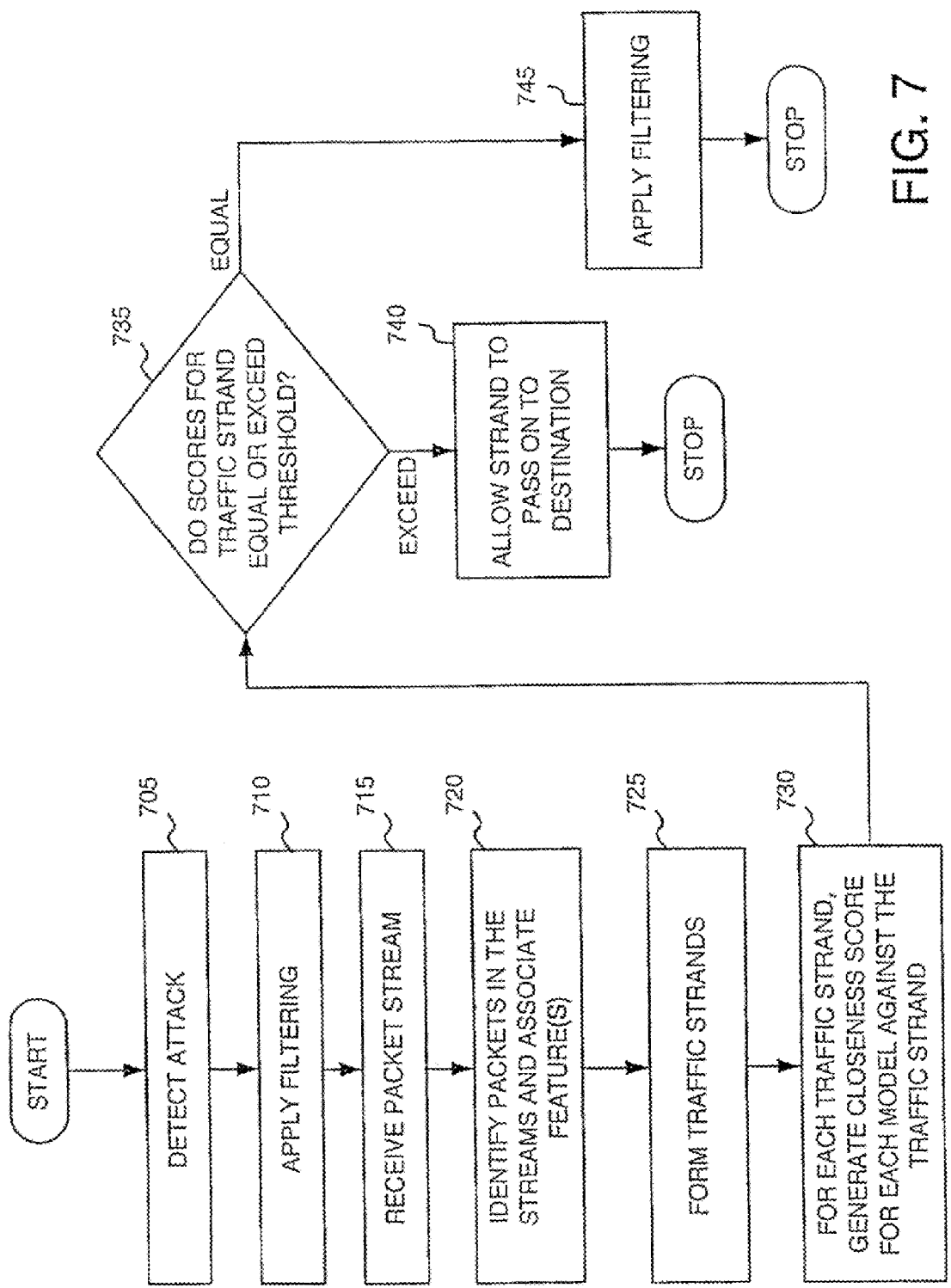

FIG. 7 illustrates an exemplary process for detecting and filtering attack traffic in an implementation consistent with the present invention. Processing may begin with filtering device 125 detecting an attack in the network using one or more conventional techniques [act 705]. In response to detecting an attack, filtering device 125 may apply filtering in a well-known manner [act 710]. The filtering may involve, for example, blocking all traffic passing through filtering device 125 or blocking some portion of the traffic passing through filtering device 125.

After filtering has been applied, triage device 130 receives a packet stream from filtering device 125 [act 715]. Triage device 130 may identify packets in the stream and associate features from a previously-defined list of features with each packet in the stream [act 720]. These features may include, for example, packet type, characteristics of packet headers, time between similar packets, and characteristics of packet loads.

Triage device 130 may also group packets (represented by the feature sets extracted from the packets) into traffic strands based, for example, on the source of the packets [act 725]. For each traffic strand, triage device 130 may generate a closeness score for each stress model against the traffic strand [act 730]. As described above, triage device 130 stores a group of previously-created HMMs (or stress models) that have been trained on normal users' behavior to different types of filtering. Triage device 130 may generate the closeness scores for all models stored in the triage device 130 or for only those models that were trained on users being blocked by the same filtering technique that was applied in act 710. Triage device 130 may further reduce the number of models by selecting that set of models trained on data performing the same type of activity as the given traffic strand.

To generate the closeness score, triage device 130 uses each model to calculate the probability of the strand. Triage device 130 associates a higher score with those models that were trained on strands similar to the received strand.

Once closeness scores have been generated for the models, triage device 130 may determine whether the scores equal or exceed a programmable threshold value [act 735]. The threshold value may be adjusted based on the level of filtering desired.

If a score for one of the models equals or exceeds the threshold value, triage device 130 may determine that the traffic strand is part of normal traffic [act 740]. Triage device 130 may then send a signal to filtering device 125 indicating that the traffic corresponding to the traffic strand can be passed on toward its destination. If, on the other hand, the scores of all the models are below the threshold value, triage device 130 may send a signal to filtering device 125 indicating that the traffic corresponding to the traffic strand should continue to be filtered using the filtering technique applied in act 610 or some other type of filtering technique [act 745].

The foregoing description of preferred embodiments of the principles of the invention provides illustration and description, but is not intended to be exhaustive or to limit the invention to the precise form disclosed. Modifications and variations are possible in light of the above teachings or may be acquired from practice of the invention. For example, while series of acts have been described in FIGS. 6 and 7, the order of the acts may vary in other implementations consistent with the principles of the invention. In

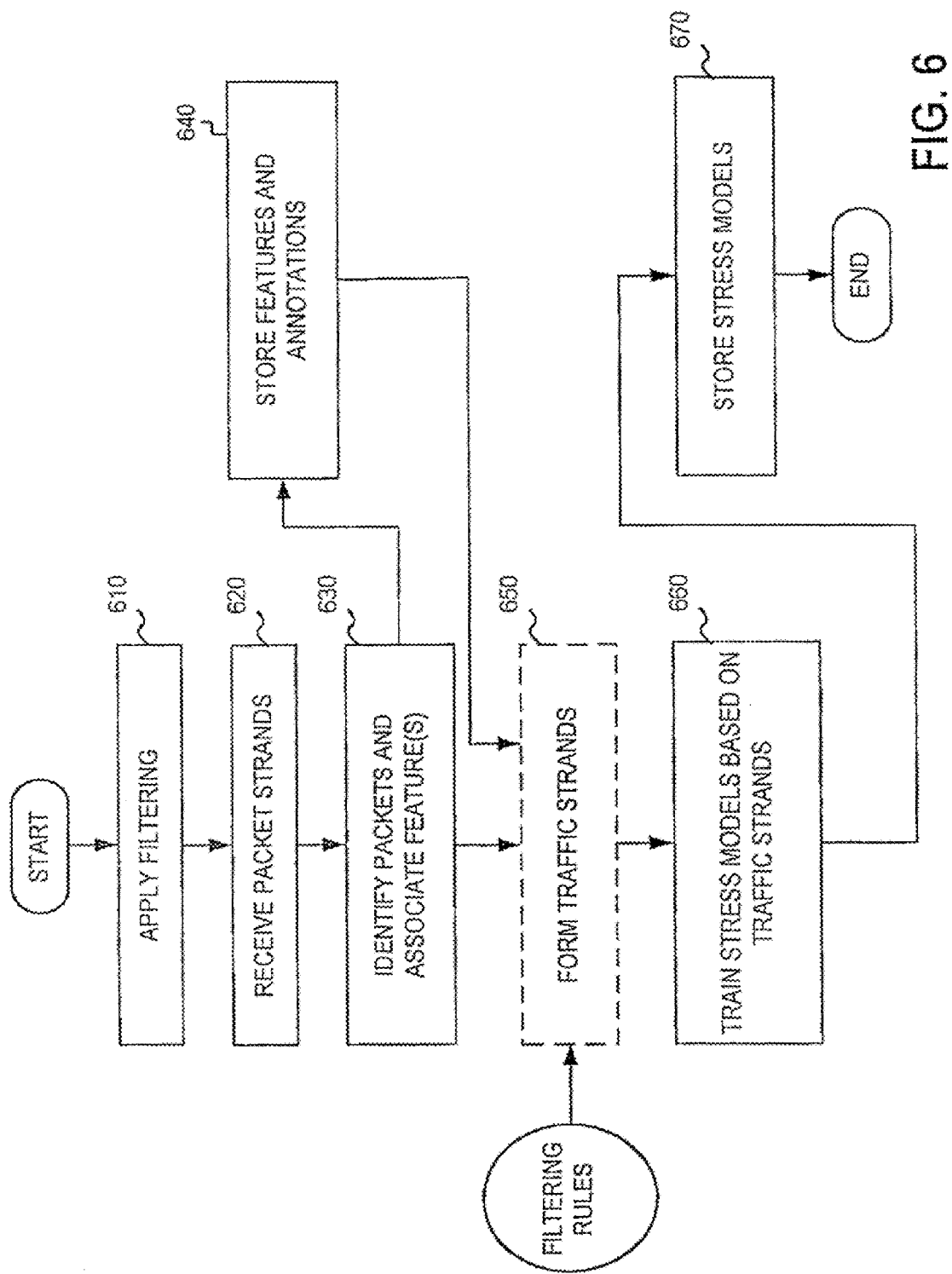

What is claimed is:

1. A system for modeling normal user behavior in a network, comprising:
 a memory configured to store instructions; and
 a processor configured to execute the instructions to:
  filter packets in the network using a first filtering technique,
  receive a group of packets from a first user after the filtering,
  associate at least one feature with each packet in the group,
  associate at least one annotation with the at least one feature, the at least one annotation including an annotation identifying the first filtering technique, and
  create at least one model reflecting a behavior of the first user based on the features associated with the group of packets.

2. The system of claim 1 wherein the at least one model includes Hidden Markov Models.

3. The system of claim 1 wherein the features include at least one of packet types, characteristics of packet headers, time between similar packets, and characteristics of packet loads.

4. The system of claim 1 wherein the processor is further configured to:
 store the at least one feature and associated at least one annotation in the memory.

5. The system of claim 1 wherein the processor is further configured to:
 verify an accuracy of the at least one model using the stored at least one feature and associated at least one annotation.

6. The system of claim 1 wherein the processor is further configured to:
 apply, after creating the at last one model, a second filtering technique,
 receive a subsequent group of packets from the first user after applying the second filtering technique, and
 create additional models reflecting the behavior of the first user in response to the second filtering technique.

7. The system of claim 1 wherein, when receiving the group of packets, the processor is configured to:
 receive a stream of packets from a plurality of users,
 identify the packets in the stream, and
 group packets from the first user.

8. A computer-readable medium containing instructions for controlling at least one processor to perform a method for modeling a behavior of users in a network in response to an application of a first filtering technique, comprising:
 receiving, subsequent to the application of the first filtering technique, a number of packets from a first user;
 associating at least one feature with each packet in the received packets
 associating at least one annotation with the at least one feature, the at least one annotation including an annotation identifying the first filtering technique; and
 creating at least one model reflecting a behavior of the first user based on the features associated with the received packets.

9. The computer-readable medium of claim 8 wherein the at least one model includes Hidden Markov Models.

10. The computer-readable medium of claim 8, wherein the at least one feature includes at least one of packet types, characteristics of packet headers, time between similar packets, and characteristics of packet loads.

11. The computer-readable medium of claim 8 wherein the receiving includes:
 receiving a stream of packets from a plurality of users, and
 grouping packets associated with the first user.

12. A system for identifying normal traffic during a network attack, comprising:
 means for receiving, subsequent to a filtering technique being applied, a stream of packets;
 means for identifying each packet in the stream;
 means for associating at least one feature with each packet;
 means for partitioning the packets into groups, each group corresponding to a plurality of packets;
 means for identifying, for each group of packets, at least one model from a plurality of previously created models, each model reflecting a normal response to an application of the filtering technique;
 means for comparing the features associated with a group of packets with features of each of the at least one identified model,
 means for generating a closeness score for each of the at least one identified model based on the comparing,
 means for determining whether the closeness score for each of the at least one identified model equals or exceeds a threshold,
 means for identifying the group of packets as a normal group when the closeness score of at least one of the identified models equals or exceeds the threshold,
 means for allowing groups of packets classified as normal groups to pass on toward their destination, and
 means for filtering groups of packets classified as attack groups using the first filtering technique.

13. A system for identifying normal traffic during a network attack, comprising:
 a memory configured to store a plurality of models, each model reflecting a normal response to an application of a filtering technique; and
 a processor connected to the memory and configured to:
  receive a stream of packets subsequent to a first filtering technique being applied,
  identify each packet in the stream;
  associate at least one feature with each packet;
  partition the stream into groups, each strand corresponding to a plurality of packets,
  identify, for each group of packets, at least one model from a plurality of previously created models, each model reflecting a normal response to an application of the filtering technique;
  compare the features associated with a group of packets with features of each of the at least one identified model,
  generate a closeness score for each of the at least one identified model based on the comparing,
  determine whether the closeness score for each of the at least one identified model equals or exceeds a threshold, identify the group of packets as a normal group when the closeness score of at least one of the identified models equals or exceeds the threshold, allow groups classified as normal groups to pass on toward their destination, and filter groups classified as attack groups using the first filtering technique.

14. The system of claim 13 wherein, when partitioning, the processor is configured to:

group packets in the stream based on a source of the packets.

15. The system of claim 13 wherein the at least one identified model includes models associated with the first filtering technique.

16. The system of claim 13 wherein the plurality of models include Hidden Markov Models.

17. A computer-readable medium containing instructions for controlling at least one processor to perform a method for identifying normal traffic during a network attack, comprising:

receiving, subsequent to an application of a first filtering technique, a stream of packets;

grouping packets in the stream based on at least a source of the packets;

associating, prior to grouping, at least one feature with each packet in the stream of packets, identifying, through the use of Hidden Markov Models (HMMs), each packet group as a normal group or attack group, the HMMs representing normal responses to the application of the first filtering technique, wherein identifying includes, identifying, for each packet group, at least one HMM from a plurality of previously created HMMs, comparing the features associated with a packet group with features of each of the at least one HMMs, generating a closeness score for each of the at least one HMMs based on the comparing, comparing each closeness score to a threshold, identifying the packet group as a normal group when at least one of the closeness scores equals or exceeds the threshold, and allowing groups of packets identified as normal groups to pass on toward their destination, and filtering packet groups classified as attack groups using the first filtering technique.

* * * * *

UNITED STATES PATENT AND TRADEMARK OFFICE
CERTIFICATE OF CORRECTION

PATENT NO. : 7,307,999 B1  Page 1 of 10
APPLICATION NO. : 10/058442
DATED : December 11, 2007
INVENTOR(S) : Donaghey It is certified that error appears in the above-identified patent and that said Letters Patent is hereby corrected as shown below:

The title page showing an illustrative figure, should be Deleted and substitute therefore the attached title page

Delete drawing sheets 1 through 5 and substitute therefore the drawing sheets consisting of figs. 1-7 as shown on the attached page Signed and Sealed this Twenty-sixth Day of August, 2008

JON W. DUDAS
*Director of the United States Patent and Trademark Office*

United States Patent
Donaghey

(10) Patent No.: US 7,307,999 B1
(45) Date of Patent: Dec. 11, 2007

(54) SYSTEMS AND METHODS THAT IDENTIFY NORMAL TRAFFIC DURING NETWORK ATTACKS

(75) Inventor: Robert J. Donaghey, Lexington, MA (US)

(73) Assignee: BBN Technologies Corp., Cambridge, MA (US)

(*) Notice: Subject to any disclaimer, the term of this patent is extended or adjusted under 35 U.S.C. 154(b) by 1074 days.

(21) Appl. No.: 10/058,442

(22) Filed: Jan. 28, 2002

Related U.S. Application Data

(60) Provisional application No. 60/269,547, filed on Feb. 16, 2001.

(51) Int. Cl.
H04J 3/16 (2006.01)
(52) U.S. Cl. .................. 370/465; 370/389; 726/23
(58) Field of Classification Search ............ 370/235, 370/252, 238, 410, 432, 401; 709/224, 240; 713/201, 162
See application file for complete search history.

(56) References Cited

U.S. PATENT DOCUMENTS

| | | | |
|---|---|---|---|
| 6,028,626 A | 2/2000 | Aviv | |
| 6,321,338 B1 | 11/2001 | Porras et al. | |
| 6,484,203 B1 | 11/2002 | Porras et al. | |
| 6,578,147 B1 | 6/2003 | Shanklin et al. | |
| 6,816,973 B1 * | 11/2004 | Gleichauf et al. | 726/13 |
| 6,839,754 B2 | 1/2005 | Nowak et al. | |
| 6,850,491 B1 * | 2/2005 | Firoiu et al. | 370/235 |
| 6,880,090 B1 * | 4/2005 | Shawcross | 726/14 |
| 2002/0002686 A1 * | 1/2002 | Vange et al. | 713/201 |
| 2002/0032774 A1 | 3/2002 | Kohler et al. | |
| 2002/0035683 A1 * | 3/2002 | Kaashoek et al. | 713/154 |
| 2003/0051026 A1 * | 3/2003 | Carter et al. | 709/224 |
| 2003/0097439 A1 * | 5/2003 | Strayer et al. | 709/224 |

OTHER PUBLICATIONS

Glave, James, "Smurfing Cripples ISPs," Wired News, www.wired.com, 4 pages, Jan. 7, 1998.
Craig, Andrew, "Internet Gets Slammed By Widespread Attack," TechWeb, Technology News, www.techweb.com, 3 pages, Mar. 4, 1998.
Schuba et al. Analysis of a Denial of Service Attack on TCP. Proceedings of the 1997 IEEE Symposium on Security and Privacy. (1997).

(Continued)

Primary Examiner—Edan Orgad
Assistant Examiner—Robert W. Wilson
(74) Attorney, Agent, or Firm—Ropes & Gray LLP

(57) ABSTRACT

A system protects against loss of communication during network attacks. In a first implementation, a system (120) models the behavior of normal users in a network in response to an application of a first packet filtering technique. The system (120) receives a group of packets from a first user subsequent to the application of the first packet filtering technique and creates one or more models reflecting the behavior of the first user based on the received packets. In another implementation, a system (130) receives a stream of packets subsequent to a filtering technique being applied, partitions the packets into groups, where each group corresponds to more than one packet, and classifies each group of packets as a normal group or an attack group using one or more models. Each model reflects a normal response to an application of the filtering technique. The system (130) forwards groups classified as normal groups, thus preventing network attacks from choking off all communication in the network.

17 Claims, 7 Drawing Sheets

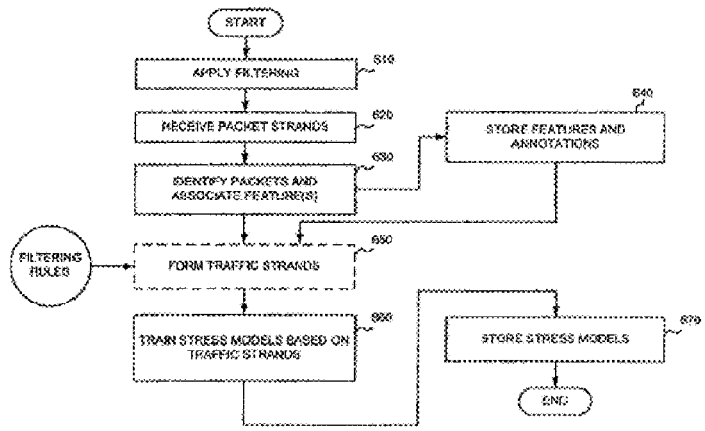

OTHER PUBLICATIONS

Denning, Dorothy E. An Intrusion-Detection Model. IEEE Transactions on Software Engineering. pp. 118-131 (1987).

Jha et al. Markov Chains, Classifiers, and Intrusion Detection. Computer Security Foundations Workshop Proceedings, 14th IEEE, pp. 206-219. (2001).

Vigna et al. NetSTAT: A Network-based Intrusion Detection Approach. ACSAC(1998).

Stallings, William. Cryptogrpahy and Network Security: Principles and Practice, 2nd ed., Prentice Hall, pp. 478-501 (1998).

* cited by examiner